United States Patent
Snyder et al.

(10) Patent No.: US 7,281,339 B2
(45) Date of Patent: Oct. 16, 2007

(54) ENCODER SYSTEM

(75) Inventors: Michael D. Snyder, Binghamton, NY (US); Koen A. Gieskes, Deposit, NY (US)

(73) Assignee: Universal Instruments Corporation, Binghamton, NY (US)

( * ) Notice: Subject to any disclaimer, the term of this patent is extended or adjusted under 35 U.S.C. 154(b) by 92 days.

(21) Appl. No.: 10/840,769

(22) Filed: May 6, 2004

(65) Prior Publication Data

US 2005/0246916 A1 Nov. 10, 2005

(51) Int. Cl.
*G01D 5/347* (2006.01)

(52) U.S. Cl. .............................. 33/706; 33/356; 33/702

(58) Field of Classification Search .................. 33/706, 33/707, 708, 702, 703, 1 PT
See application file for complete search history.

(56) References Cited

U.S. PATENT DOCUMENTS

| | | | | |
|---|---|---|---|---|
| 2,875,524 A * | 3/1959 | Bower et al. ................. | 33/708 |
| 3,100,345 A * | 8/1963 | Burkhardt ................... | 33/1 PT |
| 3,339,704 A * | 9/1967 | Clark et al. ................. | 33/1 PT |
| 3,633,189 A | 1/1972 | Billawala | |
| 3,742,488 A | 6/1973 | Von Voros | |
| 3,816,002 A * | 6/1974 | Wieg .......................... | 356/395 |
| 3,816,003 A * | 6/1974 | Litke ........................... | 33/707 |
| 4,224,581 A | 9/1980 | Watanabe et al. | |
| 4,320,577 A | 3/1982 | Lauritzen | |
| 4,363,964 A * | 12/1982 | Schmitt ....................... | 33/707 |
| 4,429,261 A | 1/1984 | Ohno | |
| 4,477,726 A * | 10/1984 | Reichi .................... | 250/237 G |
| 4,625,109 A | 11/1986 | Nixon | |
| 4,789,874 A | 12/1988 | Majette et al. | |
| 4,791,289 A * | 12/1988 | Watanabe et al. ....... | 250/237 G |
| 4,795,925 A | 1/1989 | Mihara et al. | |
| 4,912,322 A | 3/1990 | Ichikawa | |
| 4,973,150 A | 11/1990 | Bryant | |
| 4,981,545 A | 1/1991 | Shinno et al. | |
| 5,027,526 A | 7/1991 | Crane | |
| 5,142,793 A * | 9/1992 | Crane ......................... | 33/763 |
| 5,182,867 A * | 2/1993 | Nelle .......................... | 33/702 |
| 5,229,836 A * | 7/1993 | Nagano ...................... | 33/707 |
| 5,276,970 A | 1/1994 | Wilcox et al. | |
| 5,406,715 A * | 4/1995 | Koizumi et al. .............. | 33/706 |
| 5,434,602 A * | 7/1995 | Kaburagi et al. ............. | 33/708 |
| 5,457,581 A | 10/1995 | Hallamasek | |
| 5,477,400 A | 12/1995 | Kawamata | |
| 5,491,391 A | 2/1996 | Bahr et al. | |
| 5,524,105 A | 6/1996 | Brewen et al. | |
| 5,864,216 A | 1/1999 | Shimizu et al. | |
| 5,929,789 A | 7/1999 | Barbehenn | |
| 5,992,969 A | 11/1999 | Arminana Terrasa et al. | |
| 6,098,295 A * | 8/2000 | Feichtinger ................. | 33/1 PT |
| 6,154,974 A * | 12/2000 | Nakajima et al. ............ | 33/707 |
| 6,254,292 B1 | 7/2001 | Navarro | |
| 6,509,577 B1 * | 1/2003 | Babikian et al. ......... | 250/559.36 |

(Continued)

*Primary Examiner*—G. Bradley Bennett
*Assistant Examiner*—Travis Reis
(74) *Attorney, Agent, or Firm*—Schmeiser, Olson & Watts

(57) ABSTRACT

A structure and associated method to accurately read an encoder tape in an encoder system. The encoder system comprises, a read head, a shoe structure adjacent the read head, and an encoder tape. The encoder tape is adapted to be read by the read head. The shoe structure is adapted to locally support the encoder tape and locally dampen a vibration of the encoder tape as the encoder tape is read by the read head.

20 Claims, 9 Drawing Sheets

U.S. PATENT DOCUMENTS

| | | |
|---|---|---|
| 6,519,860 B1 | 2/2003 | Bieg et al. |
| 6,559,633 B1 | 5/2003 | Nachtigal et al. |
| 6,609,645 B1 | 8/2003 | Groel et al. |
| 6,668,466 B1 | 12/2003 | Bieg et al. |
| 2001/0037580 A1* | 11/2001 | Tondorf ................ 33/706 |
| 2002/0022192 A1 | 2/2002 | Morton |
| 2004/0003510 A1 | 1/2004 | Henshaw et al. |
| 2004/0004122 A1 | 1/2004 | Gelbart |

* cited by examiner

US 7,281,339 B2

ENCODER SYSTEM

BACKGROUND OF THE INVENTION

1. Technical Field

This invention relates to encoder systems used in positioning systems.

2. Related Art

Current encoder systems used for positioning systems typically use precision scales and reading devices. However, the current encoder systems are typically very expensive, especially when there is a long axis of travel. In addition, they are very sensitive to positional misalignment between the reading device and the precision scale which causes not only a labor intensive installation process, but requires high precision machining of the mounting surfaces to which the system mounts. Therefore there is a need for an inexpensive, accurate, and easy to install an encoder system for use with a positioning system.

SUMMARY OF THE INVENTION

The present invention provides an encoder system comprising:
a read head;
a shoe structure adjacent the read head; and
an encoder tape adapted to be read by the read head, wherein the shoe structure is adapted to locally supports the encoder tape and locally dampen a vibration of the encoder tape as the encoder tape is read by the read head.

The present invention provides a method comprising:
providing an encoder system comprising, a read head, a shoe structure adjacent the read head, and an encoder tape;
reading by the read head, the encoder tape;
locally supporting by the shoe structure, the encoder tape as the encoder tape is read by the read head; and
locally dampening by the shoe structure; a vibration of the encoder tape as the encoder tape is read by the read head.

The present invention advantageously provides a structure and associated method for an inexpensive, accurate, and easy to install an encoder system for use with a positioning system.

DETAILED DESCRIPTION OF THE INVENTION

Figure 1:
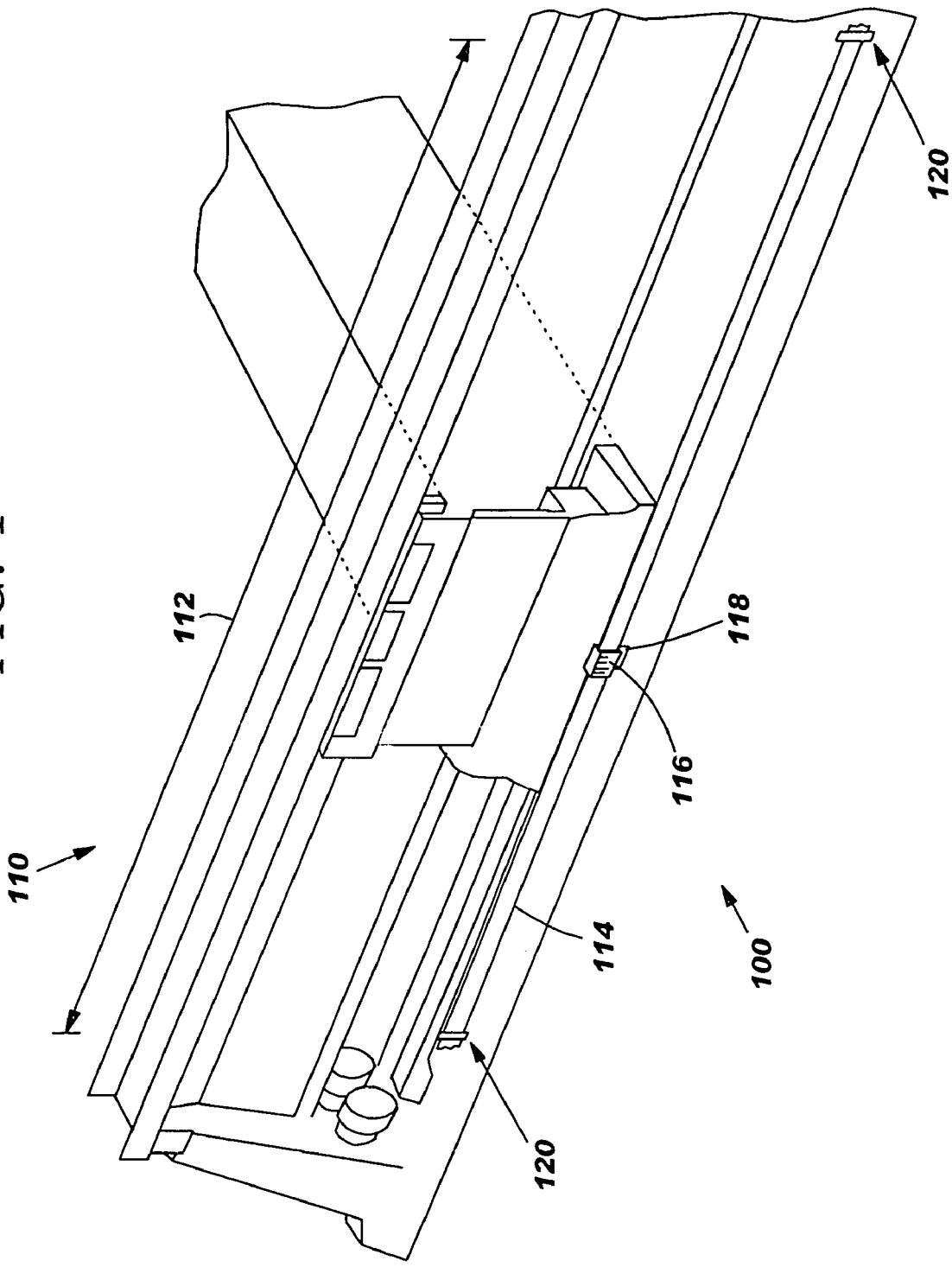
FIG. 1 illustrates a perspective view of an encoder system mounted within a positioning system, in accordance with embodiments of the present invention.

FIG. 1 illustrates a perspective view of an encoder system 100 mounted within a positioning system 110, in accordance with embodiments of the present invention. The encoder system controls a spatial position (e.g., in an X, Y, or Z plane) of the positioning system 110. The encoder system comprises, an encoder tape 114, a read head 116, and a shoe 118. The read head 116 and the shoe 118 in combination form an encoder structure 119. Ends 120 of the encoder tape 114 are secured on either side of the axis of travel 112 of the read head 116 and the shoe 118. The encoder tape 114 has lines (e.g., see lines 32 in FIG. 2A), features, markings, aperture type features (e.g., openings, holes, slots, etc.) on it as can be read by the read head 116.

Figure 2A:
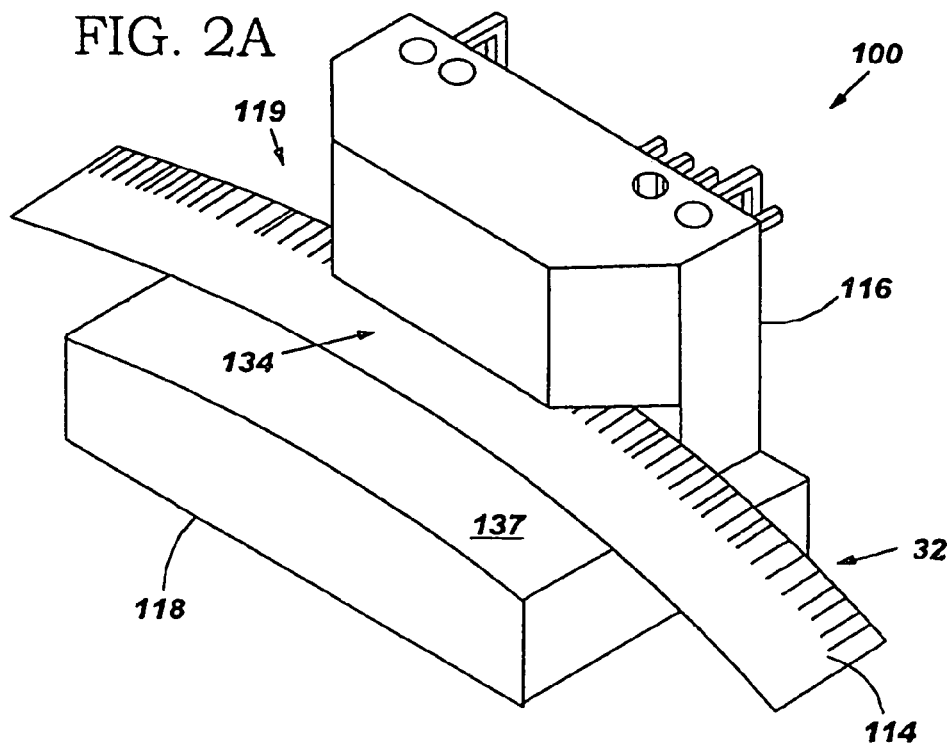
FIG. 2A illustrates a perspective view of the encoder system of FIG. 1, in accordance with embodiments of the present invention.
Figure 2B:
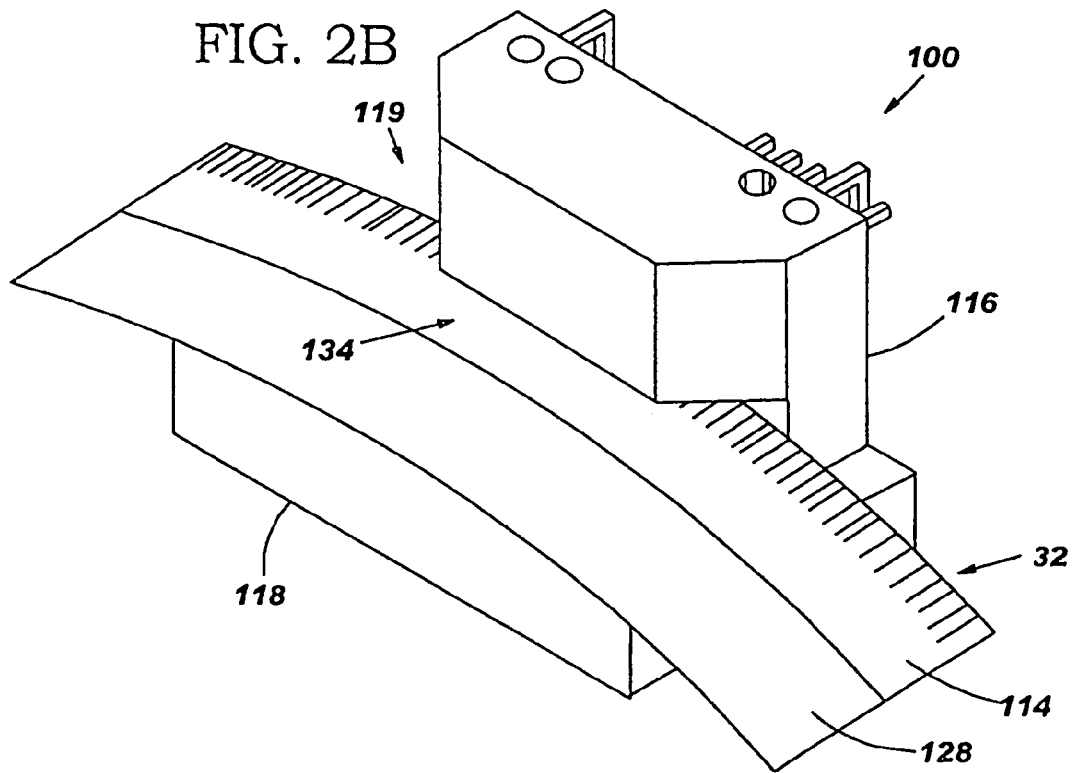
FIG. 2B illustrates an alternative embodiment of the encoder system of FIG. 2A, in accordance with embodiments of the present invention.

The encoder tape 114 may be any encoder tape known to a person of ordinary skill in the art including, inter alia, a clear plastic encoder tape with lines, markings, or features (as shown in FIGS. 2-3), a non-clear encoder tape (e.g., opaque or reflective) with aperture type features (e.g., openings, holes, slots, etc), etc. When using a clear encoder tape with lines, markings, or features, the read head 116 may comprise an illumination source pointing to one side of the encoder tape 114 and a custom Application Specific Integrated Circuit (ASIC) read device pointing to the other side of the encoder tape 114 (e.g., see FIG. 4). When using a non-clear encoder tape with aperture type features, the read head 116 typically consists of an illumination source and an ASIC both pointing to a same side of the encoder tape 114. The non-clear encoder tape may comprise, inter alia, metal. The read head 116 of the encoder system 100 reads the lines, features, markings, or aperture type features of the encoder tape as the read head 116 and encoder tape 114 are moved relative to one another. Shoe 118 is attached to the read head 116 and lightly contacts the encoder tape 114 (i.e., supports the encoder tape 114) at a local area 134 along the encoder tape 114 where readings are being made by the read head 116. Additionally, the shoe 118 dampens any vibrations imparted to the encoder tape 114 from the positioning system 110 or outside sources and exacerbated by a long length (e.g., greater than 2 feet) of the encoder tape 114. The term "dampen" (and all derivatives of the term dampen, e.g., dampened, dampening, etc.) is defined herein including in the claims as a reduction of an amplitude of oscillation (i.e., vibration) of the encoder tape 114 (i.e., reducing a vibration that causes the encoder tape 114 at the read head 116 to move closer to or farther from the illumination source and ASIC within the read head 116. An undampened vibration of the encoder tape 114 may cause problems in reading markings on the encoder tape 114 by the read head 116, resulting in lost counts or inaccurate determination of position of the positioning system 110. The shoe 118 allows the encoder tape 114 to maintain a constant distance between the illumination source and ASIC within the read head 116. If a plastic encoder tape (i.e., encoder tape 114) is used, the plastic encoder tape 114 may be bonded to a metal strip 128 (see FIG. 2B). The metal strip 128 acts as a stabilizer and offers a more robust means for support within the positioning system 110 as well as largely eliminating the effect of plastic encoder tape creep or length change due to moisture absorption. An additional benefit of a metal encoder tape (i.e., encoder tape 114) or the addition of the metal strip 128 to a plastic encoder tape is that the metal strip 128 helps provide a ground path for static buildup. The positioning system 110 may be used in, inter alia, a pick and place machine. The pick and place machine may comprise additional positioning systems that are the same as the positioning system 110.

FIG. 2A illustrates a perspective view of the encoder system 100 of FIG. 1, in accordance with embodiments of the present invention. FIG. 2A illustrates how encoder tape 114 passes through read head 116 while being supported by shoe 118. Encoder tape 114 lightly contacts a top surface 137 of the shoe 118 at the local area 134 along the encoder tape 114 where read head 116 reads encoder tape 114.

FIG. 2B illustrates an alternative embodiment of the encoder system 100 of FIG. 2A, in accordance with embodiments of the present invention.

In contrast to FIG. 2A, FIG. 2B additionally comprises a metal strip 128 attached to encoder tape 114. In this instance the metal strip 128 lightly contacts shoe 118 at portion 122 of a top surface 137 the shoe 118 (see FIG. 4). The metal strip 128 acts as a stabilizer and offers a more robust means for supporting the encoder tape 144 within the positioning system 110 of FIG. 1.

Figure 3A:
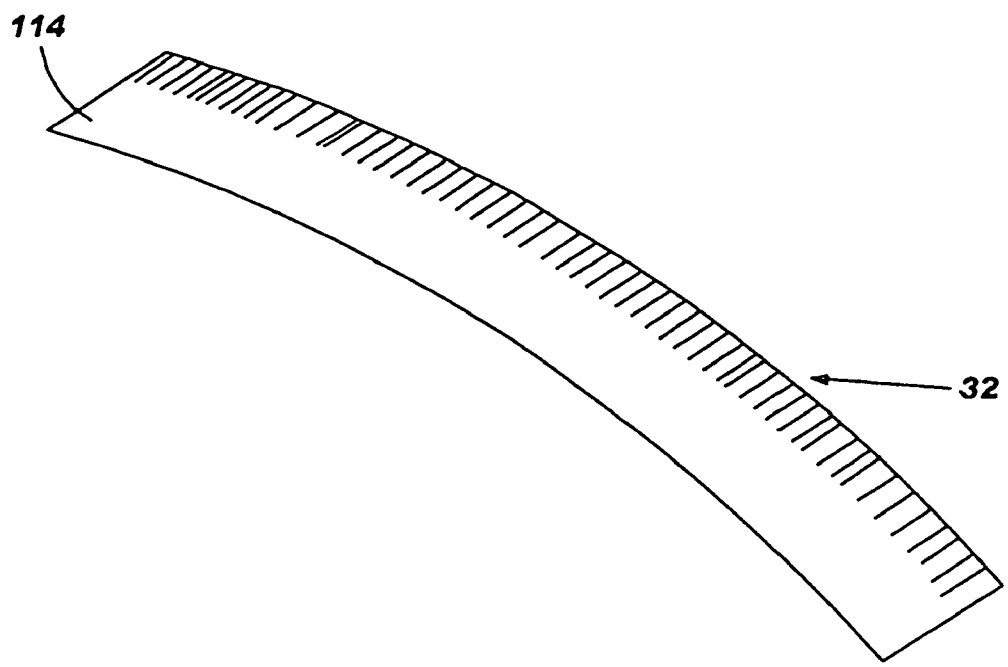
FIG. 3A illustrates a perspective view of the encoder tape of FIG. 2A, in accordance with embodiments of the present invention.

FIG. 3A illustrates a perspective view of the encoder tape 114 of FIG. 2A, in accordance with embodiments of the present invention. The encoder tape 114 comprises precision lines 32 (precision lines 32 may alternatively be any features, markings, or aperture type features (e.g., openings, holes, slots, etc)) for the read head 116 to read. The encoder tape 114 may be any encoder tape known to a person of ordinary skill in the art including, inter alia, a clear plastic encoder tape with lines, markings, or features (as shown in FIGS. 2-3), a non-clear encoder tape (e.g., opaque or reflective) with aperture type features (e.g., openings, holes, slots, etc), etc. A clear plastic encoder tape may comprise, inter alia, Mylar™. The non-clear encoder tape may comprise, inter alia, metal.

Figure 3B:
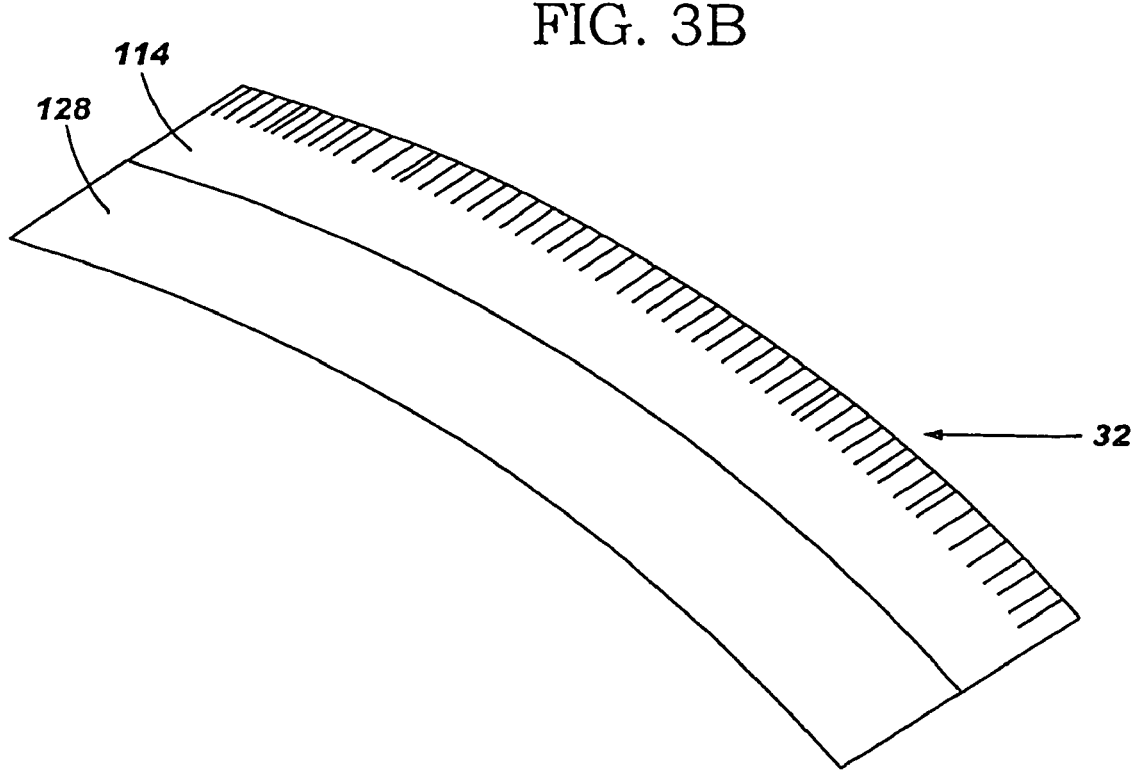
FIG. 3B illustrates a perspective view of the encoder tape of FIG. 2B, in accordance with embodiments of the present invention.

FIG. 3B illustrates a perspective view of the encoder tape 114 of FIG. 2B, in accordance with embodiments of the present invention. The encoder tape 114 is bonded to a metal strip 128. The metal strip 128 may be made of stainless steel. This invention is not limited encoder tapes made only of clear plastic. Encoder tapes made of metal as well. In either case the encoder tape 114 will have some sort of features such as precision lines or apertures in the metal tape that may be read by read head 116.

Figure 4:
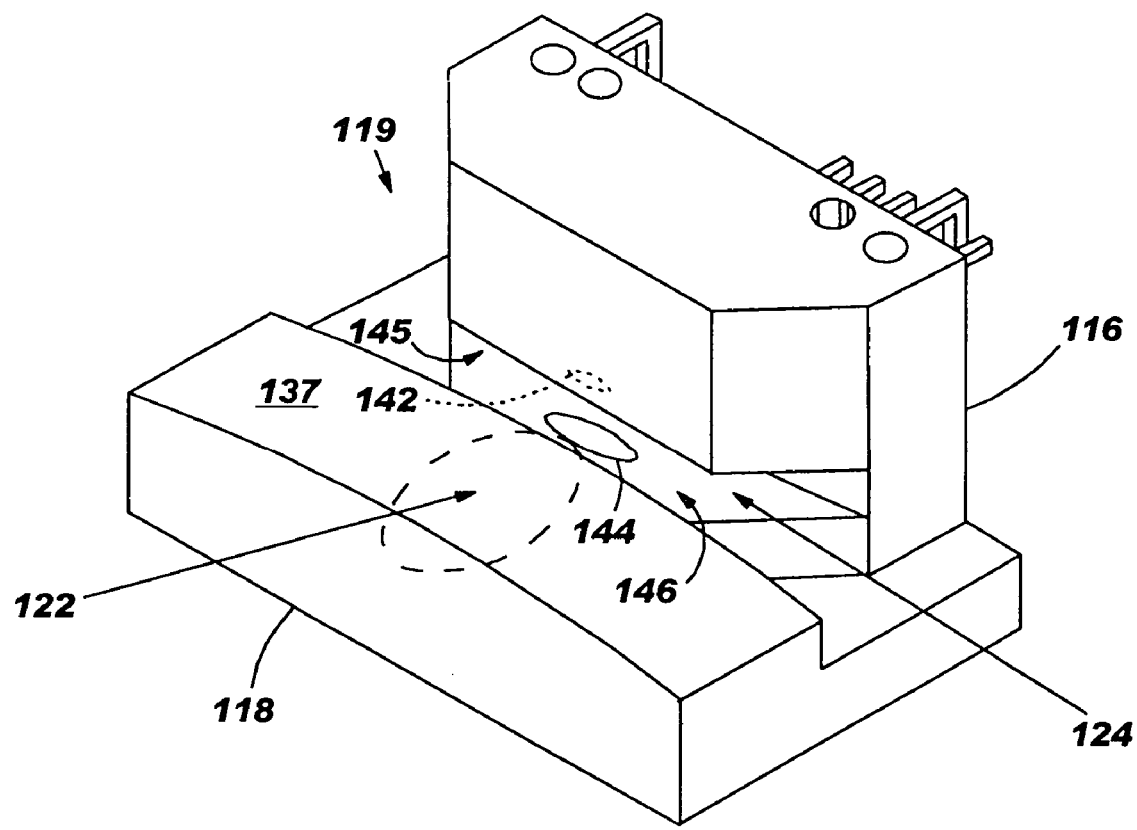
FIG. 4 illustrates a perspective view of the read head and the shoe of FIGS. 1-3, in accordance with embodiments of the present invention.

FIG. 4 illustrates a perspective view of the read head 116 and the shoe 118 (i.e., encoder structure 119) of FIGS. 1-3, in accordance with embodiments of the present invention. A slot 124 in read head 116 can be seen. On a top side 145 of slot 124 is mounted a light emitting diode (LED) 142. On a bottom side 146 of slot 124 is mounted an ASIC 144. The LED 142 and ASIC 144 positions may be reversed or the LED 142 and ASIC 144 may be on a same side (i.e., both on side 145 or both on side 146). Encoder tape 114 passes through slot 124 allowing the light from the LED 142 to pass through the encoder tape 114 such that the ASIC 144 may read precision lines marked on encoder tape 114. A portion 122 of the top surface 137 of the shoe 118 indicates where on shoe 118 either the encoder tape 114 or metal strip 128 lightly contacts the shoe 118. This invention is not limited to a read head 116 of this configuration. Other possibilities for construction of the read head 116 exist. For example, in the case where the encoder tape is not clear or does not have apertures, an illumination source may be mounted on the same side as the ASIC to illuminate features on encoder tape 114. Although the current design uses a smooth top surface 137 lightly rubbing on encoder tape 114 and/or metal strip 128, other means may be used including but not limited to: an additional second shoe (see FIG. 6), one or more rollers (see roller 130 of FIG. 7 or rollers 130 and 147 of FIG. 8), a non-contact but close clearance design such as an air bearing (see air bearing in FIGS. 9 and 10), to contact encoder tape 114.

Figure 5:
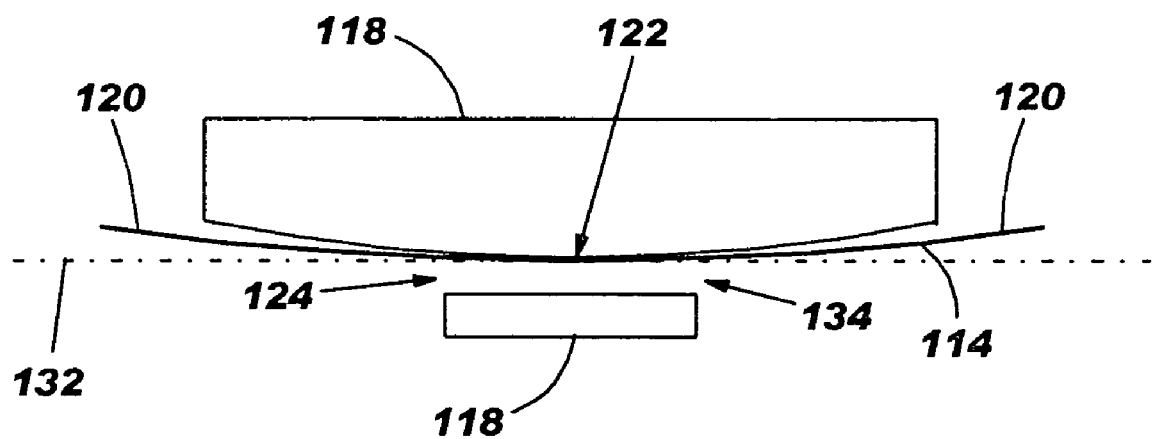
FIG. 5 illustrates a top cross sectional view of the encoder system of FIG. 1, in accordance with embodiments of the present invention.

FIG. 5 illustrates a top cross sectional view of the encoder system 100 of FIG. 1, in accordance with embodiments of the present invention. The dashed line represents a constant preferred plane 132 for the encoder tape 114 to be accurately read by the read head 116. The shoe 118 maintains the encoder tape 114 in the constant preferred plane 132 at the local area 134 along the encoder tape 114 where read head 116 reads encoder tape 114 thereby supporting the encoder tape 114 and dampening any vibrations imparted to the encoder tape 114 from the positioning system 110 or any outside sources.

Figure 6:
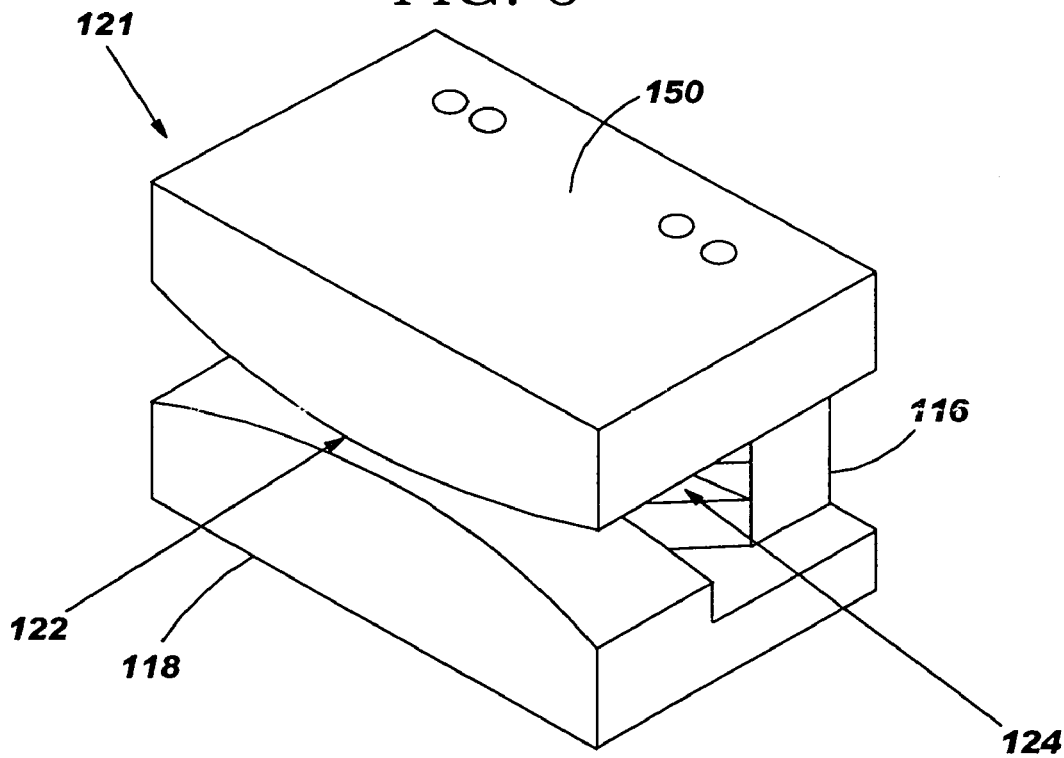
FIG. 6 illustrates a first variation of the encoder structure of FIG. 4, in accordance with embodiments of the present invention.

FIG. 6 illustrates a variation of the encoder structure 119 of FIG. 4 showing an encoder structure 121, in accordance with embodiments of the present invention. In contrast to FIG. 4, the encoder structure 121 of FIG. 6 comprises an additional shoe 150. The shoe 150 is similar in structure to the shoe 118. The shoe 150 in combination with the shoe 118 locally support the encoder tape 114 (i.e., between shoes 118 and 150) and dampen any vibrations imparted to the encoder tape 114. Supporting and dampening occur locally at local area 134 (see FIG. 2) along the encoder tape 114 where readings are being made by the read head 116.

Figure 7:
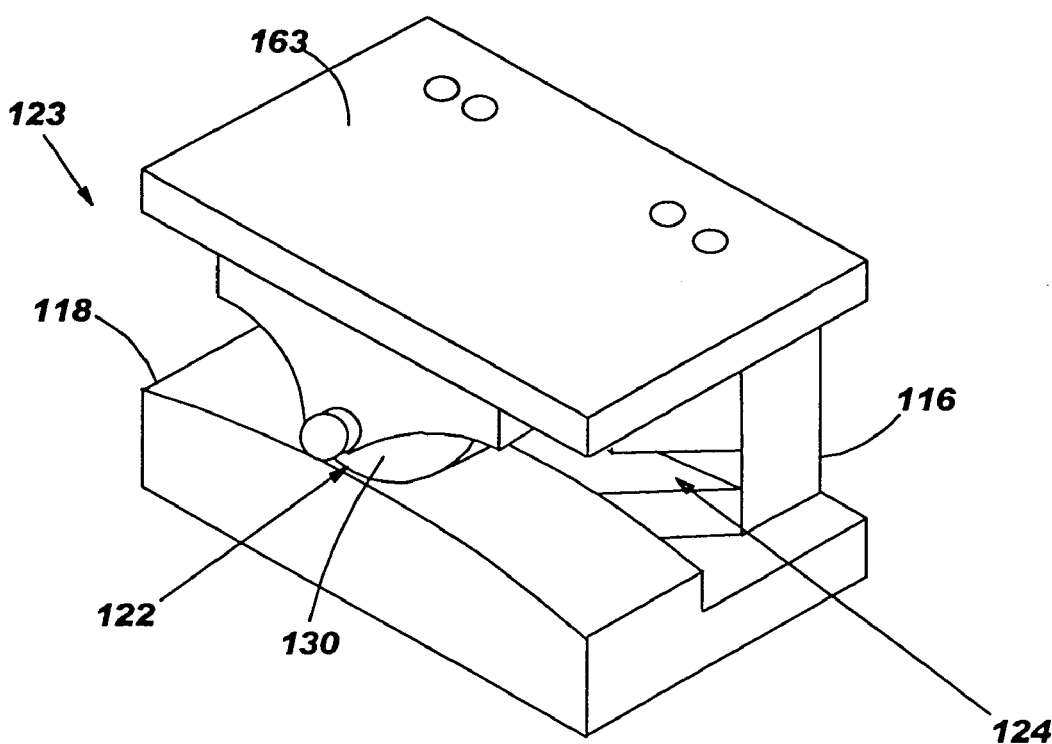
FIG. 7 illustrates a variation of the encoder structure of FIG. 6, in accordance with embodiments of the present invention.

FIG. 7 illustrates a variation of the encoder structure 121 of FIG. 6 showing an encoder structure 123, in accordance with embodiments of the present invention. In contrast to FIG. 6, the encoder structure 123 of FIG. 7 comprises a shoe 163 replacing the shoe 150 of FIG. 6. The shoe 163 comprises a roller bearing 130 for contacting the encoder tape 114. The shoe 163 in combination with the shoe 118 locally support the encoder tape 114 (i.e., between shoes 118 and 163) and dampen any vibrations imparted to the encoder tape 114. Supporting and dampening occur locally at local area 134 (see FIG. 2) along the encoder tape 114 where readings are being made by the read head 116.

Figure 8:
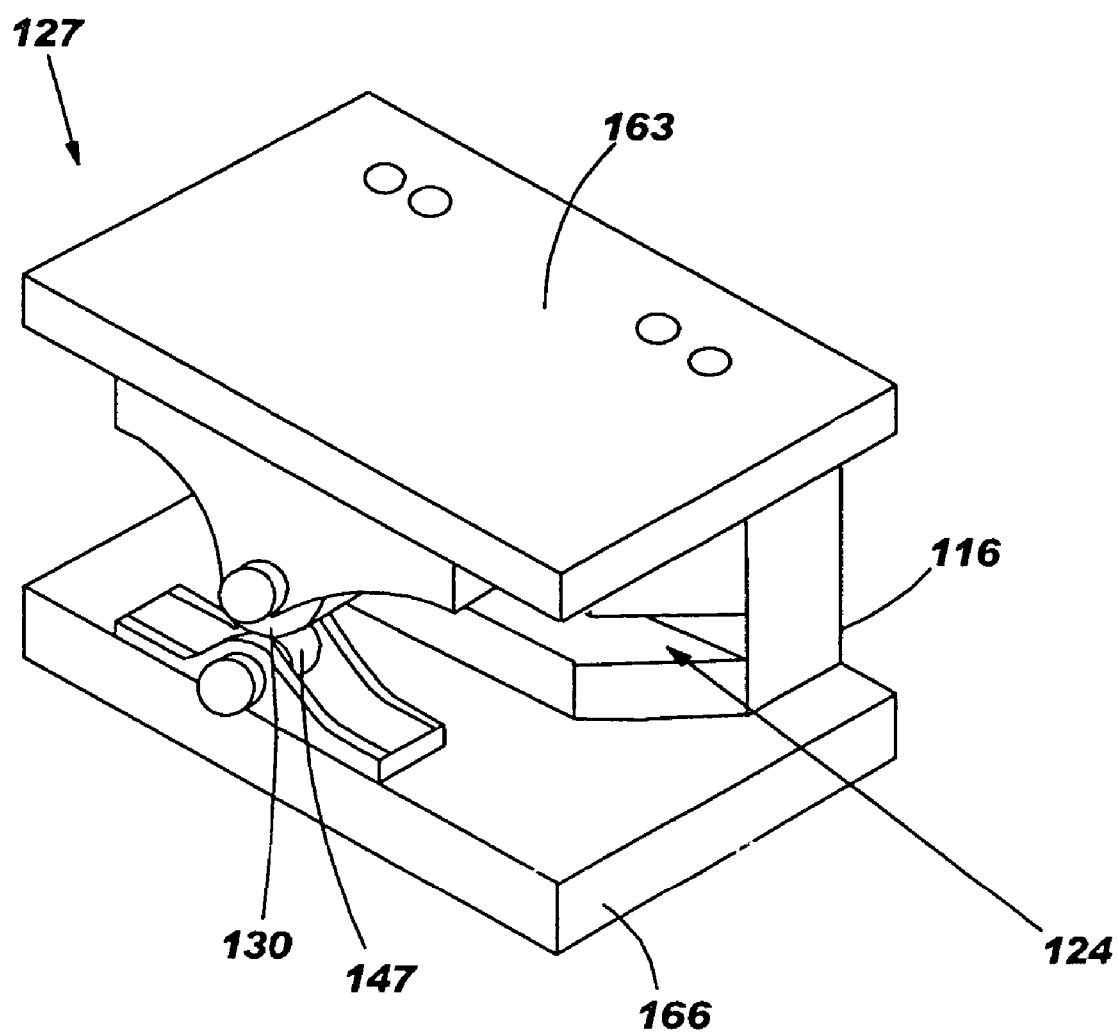
FIG. 8 illustrates a variation of the encoder structure of FIG. 7, in accordance with embodiments of the present invention.

FIG. 8 illustrates a variation of the encoder structure 123 of FIG. 7 showing an encoder structure 127, in accordance with embodiments of the present invention. In contrast to FIG. 7, the encoder structure 127 of FIG. 8 comprises a shoe 166 replacing the shoe 118 of FIG. 7. The shoe 166 comprises a roller bearing 147 for contacting the encoder tape 114. The shoe 163 comprising the roller bearing 130 in combination with the shoe 166 comprising the roller bearing 147 locally support the encoder tape 114 (i.e., between shoes 118 and 163) and dampen any vibrations imparted to the encoder tape 114. Supporting and dampening occur locally at local area 134 (see FIG. 2) along the encoder tape 114 where readings are being made by the read head 116.

Figure 9:
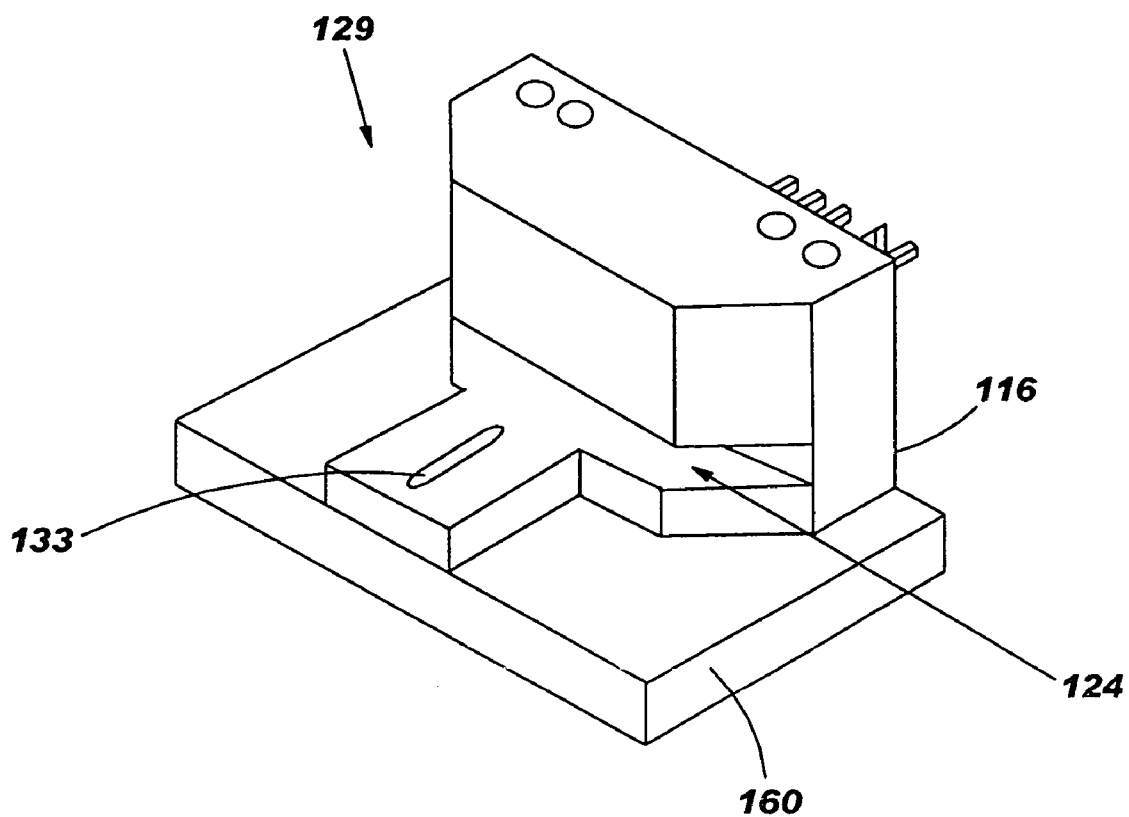
FIG. 9 illustrates a second variation of the encoder structure of FIG. 4, in accordance with embodiments of the present invention.

FIG. 9 illustrates a variation of the encoder structure 119 of FIG. 4 showing an encoder structure 129, in accordance with embodiments of the present invention. In contrast to FIG. 4, the encoder structure 129 of FIG. 9 comprises an air bearing 133 attached to a shoe 160. The air bearing 133 is adapted to emit a light stream of air (other gasses may be used instead of air) to locally support the encoder tape and dampen any vibrations imparted to the encoder tape 114. Supporting and dampening occur locally at local area 134 (see FIG. 2) along the encoder tape 114 where readings are being made by the read head 116.

Figure 10:
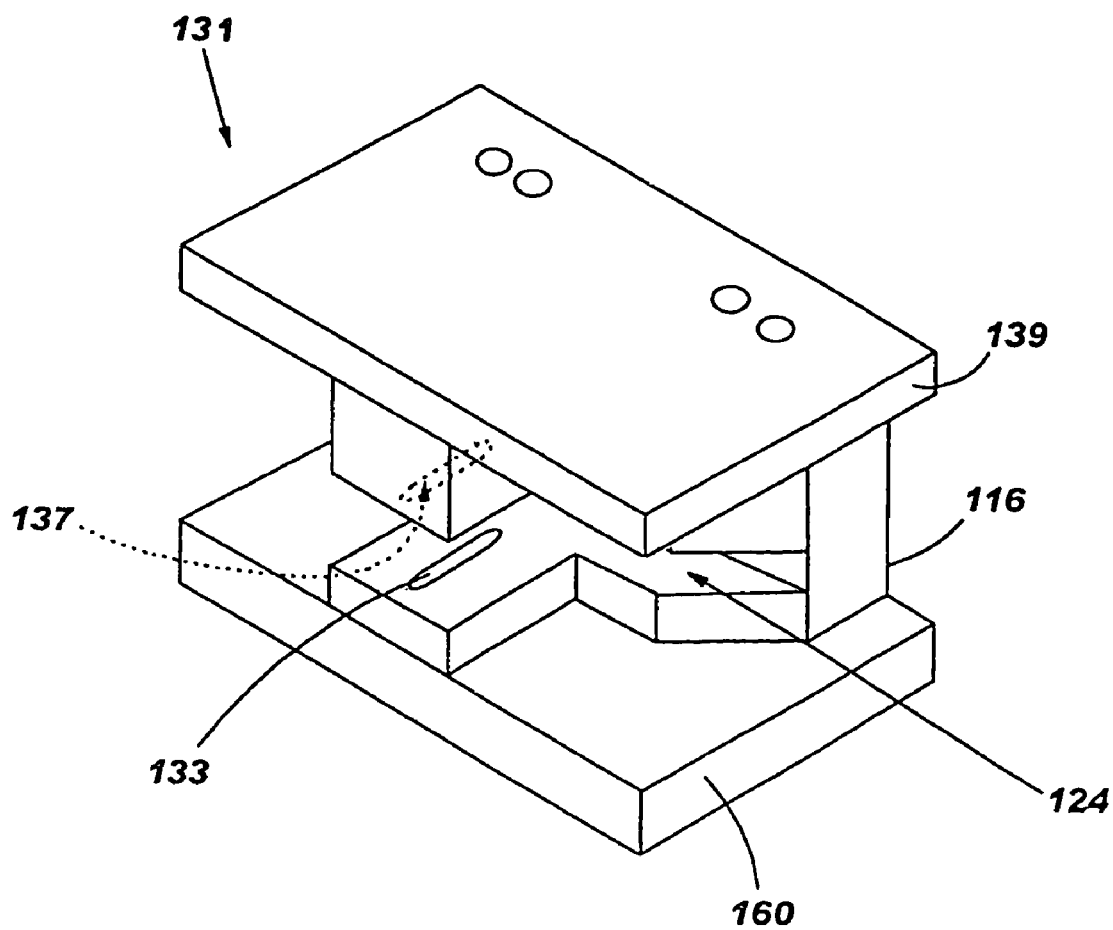
FIG. 10 illustrates a variation of the encoder structure of FIG. 9, in accordance with embodiments of the present invention.

FIG. 10 illustrates a variation of the encoder structure 129 of FIG. 9 showing an encoder structure 131, in accordance with embodiments of the present invention. In contrast to FIG. 9, the encoder structure 134 of FIG. 10 comprises an additional air bearing 137 attached to an additional shoe 139. The air bearing 137 is adapted to emit a light stream of air (other gasses may be used instead of air) to in combination with the air bearing 133 locally support the encoder tape 114 (i.e., between air bearings 137 and 133) and dampen any vibrations imparted to the encoder tape 114. Supporting and dampening occur locally at local area 134 (see FIG. 2) along the encoder tape 114 where readings are being made by the read head 116.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An encoder system comprising:
   a read head;
   a shoe structure adjacent the read head; and
   an encoder tape positioned to be read by the read head at a local area,
   wherein the encoder tape is secured at least at a first end and at a second end, and
   wherein the encoder tape is only locally supported by the shoe structure at the local area, and further wherein a vibration of the encoder tape is only locally dampened by the shoe structure at the local area, as the encoder tape is read by the read head.

2. The encoder system of claim 1, wherein said dampening comprises locally maintaining the encoder tape in a constant plane as the encoder tape is read by the read head.

3. The encoder system of claim 1, wherein the encoder system is adapted to control a spatial position of at least one positioning system.

4. The encoder system of claim 3, wherein the at least one positioning system is mounted in a pick and place machine.

5. The encoder system of claim 1, wherein the shoe structure comprises at least one smooth convex surface to dampen the vibration of the encoder tape as the encoder tape is read by the read head.

6. The encoder system of claim 1, wherein the shoe structure comprises at least one roller bearing to dampen the vibration of the encoder tape as the encoder tape is read by the read head.

7. The encoder system of claim 1, wherein the shoe structure comprises at least one air bearing to dampen the vibration of the encoder tape as the encoder tape is read by the read head.

8. The encoder system of claim 1, wherein the encoder tape extends laterally.

9. The encoder system of claim 8, wherein the encoder tape is at least 2 feet long.

10. The encoder system of claim 1, wherein the encoder tape is bonded to a metal strip adapted to act as a stiffener for the encoder tape.

11. A method comprising:
    providing an encoder system comprising, a read head, a shoe structure adjacent the read head, and an encoder tape;
    securing the encoder tape at least at a first end and at a second end;
    reading by the read head, the encoder tape at a local area;
    only locally supporting by the shoe structure at the local area, the encoder tape as the encoder tape is read by the read head; and
    only locally dampening by the shoe structure at the local area, a vibration of the encoder tape as the encoder tape is read by the read head.

12. The method of claim 11, wherein said dampening comprises locally maintaining the encoder tape in a constant plane as the encoder tape is read by the read head.

13. The method of claim 11, further comprising controlling by the encoder system, a spatial position of at least one positioning system.

14. The method of claim 13, further comprising:
    providing a pick and place machine; and
    using by the pick and place machine, the at least one positioning system.

15. The method of claim 11, wherein the shoe structure comprises at least one smooth convex surface to locally dampen the vibration of the encoder tape as the encoder tape is read by the read head.

16. The method of claim 11, wherein the shoe structure comprises at least one roller bearing to locally dampen the vibration of the encoder tape as the encoder tape is read by the read head.

17. The method of claim 11, wherein the shoe structure comprises at least one air bearing to locally dampen the vibration of the encoder tape as the encoder tape is read by the read head.

18. The method of claim 11, wherein the encoder tape extends laterally.

19. The method of claim 18, wherein the encoder tape is longer than at least 2 feet long.

20. The method of claim 11, wherein the encoder tape is bonded to a metal strip adapted to act as a stiffener for the encoder tape.

* * * * *